(12) United States Patent
Luessem et al.

(10) Patent No.: US 8,792,898 B2
(45) Date of Patent: Jul. 29, 2014

(54) TECHNIQUE FOR MANAGING CALL-ROUTING NUMBERS FOR MOBILE COMMUNICATION NETWORKS

(75) Inventors: Volker Luessem, Erftstadt (DE); Giota Anagnostopoulou, Kallithea-Athens (GR)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 78 days.

(21) Appl. No.: 13/515,434

(22) PCT Filed: Dec. 15, 2009

(86) PCT No.: PCT/EP2009/008971
§ 371 (c)(1),
(2), (4) Date: Jul. 30, 2012

(87) PCT Pub. No.: WO2011/072700
PCT Pub. Date: Jun. 23, 2011

(65) Prior Publication Data
US 2012/0289235 A1 Nov. 15, 2012

(51) Int. Cl.
*H04W 40/00* (2009.01)
(52) U.S. Cl.
USPC ........ 455/445; 455/422.1; 370/352; 370/353; 379/219; 379/220.01; 379/221.01; 379/221.14
(58) Field of Classification Search
USPC ............ 455/445, 422.1, 432.1, 436; 370/252, 370/254, 352–356; 379/219–222
See application file for complete search history.

(56) References Cited

U.S. PATENT DOCUMENTS

| | | | | |
|---|---|---|---|---|
| 5,995,609 | A * | 11/1999 | Melnyk et al. | 379/221.13 |
| 6,097,801 | A * | 8/2000 | Williams et al. | 379/221.13 |
| 6,522,741 | B1 * | 2/2003 | Crowl | 379/207.11 |
| 7,043,248 | B2 * | 5/2006 | Hallenstal et al. | 455/445 |
| 8,103,279 | B2 * | 1/2012 | Berteau et al. | 455/445 |
| 2002/0187790 | A1 * | 12/2002 | Papadimitriou et al. | 455/452 |
| 2005/0250501 | A1 | 11/2005 | Mobin et al. | |
| 2006/0029002 | A1 | 2/2006 | Park et al. | |
| 2007/0109960 | A1 * | 5/2007 | Feng | 370/219 |
| 2008/0123625 | A1 | 5/2008 | Buckley | |
| 2010/0093344 | A1 * | 4/2010 | Chan et al. | 455/433 |

FOREIGN PATENT DOCUMENTS

| | | | | |
|---|---|---|---|---|
| WO | 9907112 A2 | 2/1999 | | |
| WO | WO 2008/077428 | * | 7/2008 | H04L 12/56 |
| WO | WO 2008/119397 | * | 10/2008 | H04W 24/04 |

* cited by examiner

*Primary Examiner* — Sharad Rampuria
*Assistant Examiner* — Mong-Thuy Tran
(74) *Attorney, Agent, or Firm* — Coats and Bennett P.L.L.C.

(57) ABSTRACT

A technique for managing call-routing numbers in a mobile communication network using a distributed switching system is provided. The switching system embodies a cluster configuration, wherein at least one cluster of the switching system comprises a plurality of cluster members, each of which is capable of routing an incoming call based on a call-routing number temporarily associated with the call. A defined series of call-routing numbers is distributed between the plurality of cluster members. The management technique makes use of a common data structure which defines an amount of assignments equal to the length of a given series of call-routing numbers, wherein each assignment uniquely associates a cluster member with one or more least significant digits of the numbers of the number series.

23 Claims, 7 Drawing Sheets

| Index | 0 | 1 | 2 | 3 | 4 | 5 | 6 | 7 | 8 | 9 |
|---|---|---|---|---|---|---|---|---|---|---|
| Data Structure 1 | 0 | 1 | 0 | 4 | 1 | 4 | 1 | 0 | 4 | 1 |
| Data Structure 2 | 1 | 4 | 1 | 0 | 4 | 0 | 4 | 1 | 0 | 4 |
| Data Structure 3 | 4 | 0 | 4 | 1 | 0 | 1 | 0 | 4 | 1 | 0 |

40

Fig. 4 unbalanced part ↓

| Index | 0 | 1 | 2 | 3 | 4 | 5 | 6 | 7 | 8 | 9 | |
|---|---|---|---|---|---|---|---|---|---|---|---|
| Data Structure 1 | 0 | 1 | 0 | 4 | 1 | 4 | 1 | 0 | 4 | 1 | 1 |
| Data Structure 2 | 0 | 1 | 0 | 4 | 1 | 4 | 1 | 0 | 4 | 4 | 4 |
| Data Structure 3 | 0 | 1 | 0 | 4 | 1 | 4 | 1 | 0 | 4 | 0 | 0 |

TECHNIQUE FOR MANAGING CALL-ROUTING NUMBERS FOR MOBILE COMMUNICATION NETWORKS

TECHNICAL FIELD

The present disclosure generally relates to call routing in mobile communication networks and, in particular, to a technique for managing call-routing numbers in a mobile communication network.

BACKGROUND

A major difficulty for handling call routing in a mobile communication network is due to subscriber mobility. A mobile subscriber can roam freely from the service area of one switch to that of another. Hence, the switch which serves the mobile subscriber—providing switching functions including call routing—may change from time to time. However, from the perspective of the calling subscriber, the change in the serving switch of the recipient subscriber is invisible. Whether the recipient subscriber is located within the service area of his "home" switch, i.e., the switch at which the recipient subscriber registers with the mobile communication network, or is under the service of a different switch, the calling subscriber always dials one and the same telephone number, or directory number, of the recipient subscriber. This number is usually called the Mobile Subscriber ISDN (MSISDN).

In order to route the call to the recipient subscriber, the switching system of the mobile communication network internally assigns a temporary number to the call and uses this number to route the call to the terminating switch of the call, that is, to the particular switch which serves the recipient subscriber at the time of the call. The temporary number, which is different from the MSISDN, is often called the Mobile Station Roaming Number (MSRN). MSRNs are usually related to the geographical numbering plan and are neither assigned to nor visible to any subscriber. An assigned MSRN remains temporarily associated with the call until the call is properly routed to the terminating switch. In short, by means of the MSRN (temporarily) associated with a mobile terminating call, the switching system of the mobile communication network can route the call to the terminating switch serving the recipient subscriber.

A similar mechanism is used for handovers, in which case the temporary number is termed as a Handover Number (HON). For a handover from an anchor switch to a non-anchor switch, HONs fulfill the similar purpose and use the similar mechanism as MSRNs described above.

In the context of the present disclosure, both MSRNs and HONs are examples of call-routing numbers as they both serve to route, or direct, a call to its destination. Call-routing numbers are usually administered in series. Each call-routing number series comprises a certain amount of call-routing numbers. Conventionally, this certain amount may be fixed, e.g., 100.

With the development of distributed computing, more and more switches in mobile networks are being implemented as distributed systems, also called switch clusters. In the language of distributed computing, a "cluster" is a set of loosely coupled computing devices that work together closely so that in many aspects they can be viewed as a single computing device. A cluster usually comprises a plurality of cluster members, or blades. A cluster member is a computing device having all the essential functional components to be considered as a computer while lacking certain features of a stand-alone device for the consideration of space, power, etc. In principle, a cluster member of a switch cluster can perform the switching function just as a conventional stand-alone switch. For example, a cluster member can handle mobile originating traffic, can receive an incoming call, can route an incoming call to the switch cluster serving the recipient subscriber of the call, and can terminate an incoming call if the recipient subscriber is served by the cluster member itself.

Applying the cluster paradigm, a switch can be configured as a switch cluster having a plurality of cluster members. Particular embodiments of the switch cluster include MSC Blade Cluster (MSC BC), MSC Server Blade Cluster (MSC SBC), etc; and accordingly, a cluster member may be an MSC blade, an MSC-S blade, etc. The cluster approach has the effect that a service area which used to be served by a stand-alone switch can now be served by a highly compact switch cluster. This provides the benefits of load balancing and high availability, to name a few. For instance, in order to keep the load for each cluster member as even as possible, a distribution mechanism distributes all subscribers served by the service area of the switch cluster over all cluster members.

Each cluster member in a switch cluster will use dedicated call-routing numbers for terminating/handing-over calls so as to be able to direct the call to the correct cluster member. The particular mechanism is to assign a complete call-routing number series to a dedicated switch cluster. This has the effect that the switch cluster allocates only call-routing numbers from its own series.

The existing solution to call-routing number management suffers from various drawbacks. For example, the addition of a cluster member (e.g., for capacity increase) requires at least one additional call-routing number series. This has an impact on the configuration of the network (particularly the part outside the switch cluster) to make routing of the new call-routing number series possible in the network.

Moreover, each cluster member requires at least one call-routing number series although the capacity of the whole cluster with n cluster members may not require n call-routing number series in view of the used traffic profile. If one number series per cluster member is insufficient, at least two number series must be defined per cluster member. This at least doubles the amount of number series, although a smaller increase of the number series (e.g., 50%) may be sufficient. Other functions require a dedicated call-routing number series per entity (e.g. MSRN per Location Area). For instance, with m entities, m MSRN number series are required. In a switch cluster with n cluster members this would require n×m MSRN number series only for functional reasons, but possibly not for capacity reasons, which is clearly a waste of resources.

SUMMARY

Accordingly, there is a need for a technique to manage call-routing numbers in a distributed switching system in a more economical and flexible manner.

To meet this need, a technique for an automatic management of the numbers of a defined call-routing number series with respect to a plurality of cluster members within a switch cluster is provided. The technique can be applied for all kinds of call-routing numbers including MSRNs, HONs and the like. As will be explained below, the technique achieves to, among other, avoid over-dimensioning of call-routing number series due to architectural and/or functional purposes without the need from a capacity's point of view. The technique will be implemented in a mobile communication network. The mobile communication network comprises a switch including at least one cluster, wherein the cluster comprises a plurality of cluster members. Each cluster member is capable of routing an incoming call, based on a temporary number associated with the call, either to a recipient subscriber served by the cluster member (itself) or to another cluster member.

According to a first aspect, a data structure for managing a series of call-routing numbers for the mobile communication network is provided. The data structure defines an amount of assignments equal to a length of the number series, wherein each assignment uniquely associates a cluster member with one or more least significant digits of the numbers of the number series.

In the data structure, each assignment may comprise an identification of the associated cluster member, i.e., a "cluster member ID". Further, the assignments themselves may be identifiable by the one or more least significant digits of the numbers. For instance, the assignments may be indexed and the indices may be identical to the one or more least significant digits of the numbers. The association between the cluster members and the one or more least significant digits of the numbers may be a random or a pseudo-random nature.

According to a further aspect, a method for distributing call-routing numbers for the mobile communication network is provided. The method comprises the steps of providing a number series comprising a plurality of call-routing numbers to be used by the cluster members for routing incoming calls, and distributing the numbers between the plurality of cluster members using a first data structure which defines an amount of assignments equal to a length of the number series provided, wherein each assignment uniquely associates a cluster member with one or more least significant digits of the numbers of the number series.

The method may further comprise the step of balancing the number distribution among the plurality of cluster members by using one or more additional such data structures. The total amount of the data structures used may equal the number of cluster members in the cluster.

The additional data structures may be defined based on the first data structure. In one example, an additional data structure may be defined by replacing each cluster member identification in the first data structure by another cluster member identification in the additional data structure, wherein the replacement is according to a fixed relation existing between the replaced cluster member identification and the replacing cluster member identification. In another example, an additional data structure may be defined by replacing a specific cluster member identification in the first data structure by another cluster member identification in the additional data structure.

According to a third aspect, a method for determining a call-routing number to be used by a cluster member of a cluster of a switch of the mobile communication network is provided. The method comprises the steps of providing a series of call-routing numbers to the cluster member; consulting a data structure which defines an amount of assignments equal to a length of the number series provided, wherein each assignment uniquely associates a cluster member with one or more least significant digits of the numbers of the number series; selecting an assignment from the data structure according to an identification of the cluster member; and combining the number series with the one or more least significant digits associated with the selected assignment to form a call-routing number to be used by the cluster member.

According to a fourth aspect, a method for determining a cluster member for routing a call is provided for the mobile communication network. The method comprises the steps of providing a call-routing number to the cluster wherein the number belongs to a series of call-routing numbers; extracting the number series from the provided number; providing a data structure which defines an amount of assignments equal to a length of the extracted number series, wherein each assignment uniquely associates a cluster member with one or more least significant digits of the numbers of the number series; extracting one or more least significant bits from the provided number; searching for an assignment of the data structure according to the one or more least significant bits extracted; and determining the cluster member according to the association between the one or more least significant digits and the cluster member.

The data structure may generally be created by applying a hash function on the number series. As a variant, the data structure may be created by hashing the number series modulo the number of cluster members of the cluster. Further, the same hash function may be applied in the method according to the third and fourth aspects.

According to another aspect, a computer program product is provided. The computer program product comprises program code portions for performing the steps of any method described therein when the computer program product is run a computer, a switch of a mobile communication network, or one or more components of a switch of a mobile communication network. The technique presented herein can be practiced by means of hardware, software or a combined hardware/software approach. As for a software aspect, the computer program product may be stored on a computer-readable recording medium.

According to a further aspect, a switch for the mobile communication network is proposed. For the cluster members of a switch cluster, a number series comprising numbers to be used for routing incoming calls is provided, wherein the numbers of the number series are distributed between the plurality of cluster members. Particularly, the cluster is adapted to distribute the numbers between the plurality of cluster members using a first data structure which defines an amount of assignments equal to a length of the number series, wherein each assignment uniquely associates a cluster member with one or more least significant digits of the numbers of the number series.

The cluster may be further adapted to balance the number distribution among the plurality of cluster members by using one or more additional such data structures. As a variant, the cluster may be adapted to use as many data structures as the number of cluster members in the cluster in order to balance the number distribution at an optimal level.

Further, the cluster of the switch may be adapted to define the additional data structures based on the first data structure. In one example, the cluster may be adapted to define an additional data structure by replacing each cluster member identification in the first data structure by another cluster member identification in the additional data structure according to a fixed relation existing between the replaced cluster member identification and the replacing cluster member identification. In another example, the cluster may be adapted to define an additional data structure by replacing a specific cluster member identification in the first data structure by another cluster member identification in the additional data structure.

According to a still further aspect, a switch for the mobile communication network is provided. The switch includes at least one cluster, wherein the cluster comprises a plurality of cluster members. A number series comprising numbers to be used by a cluster member for routing an incoming call is provided to the cluster member. The switch is adapted to consult a data structure which defines an amount of assignment equal to a length of the number series, wherein each assignment uniquely associates a cluster member with one or more least significant digits of the numbers of the number series; the switch is further adapted to select an assignment from the data structure according to an identification of the cluster member and combine the number series with the one or more least significant digits associated with the selected assignment to form a call-routing number to be used by the cluster member.

According to yet a further aspect, a switch for the mobile communication network is provided. The switch includes at least one cluster, wherein the cluster comprises a plurality of cluster members. A call-routing number is provided to the cluster wherein the number belongs to a series of call-routing numbers to be used by cluster members for routing incoming calls. The switch is adapted to extract the number series from the provided number; provide a data structure which defines an amount of assignments equal to a length of the number series wherein each assignment uniquely associates a cluster member with one or more least significant digits of the numbers of the number series; extract one or more least significant bits from the provided number; search for an assignment of the data structure according to the one or more least significant digits extracted; and determine the cluster member according to the association between the one or more least significant digits and the cluster member.

The cluster suggested herein may be further adapted to create the respective data structure by applying a hash function on the number series. As a particular variant, the cluster may be adapted to create the respective data structure by hashing the number series modulo the number of cluster members of the cluster.

BRIEF DESCRIPTION OF THE DRAWINGS

Below, the present disclosure will be described with reference to embodiments illustrated in the drawings, wherein.

DETAILED DESCRIPTION

In the following, for purposes of explanation and not limitation, specific details are set forth in order to provide a thorough understanding of the technique presented herein. It will be apparent to those skilled in the art that this technique may be practised in embodiments that depart from these specific details. For instance, although the exemplary embodiments are described in connection with the specific network layout of FIG. 1, it can be easily appreciated by those skilled in the art that the technique is equally applicable to network layouts of other types. For another instance, although the exemplary embodiments are mainly described in connection with MSRN numbers and MSRN number series, the technique presented herein is equally applicable to HON numbers and HON number series.

Those skilled in the art will further appreciate that the functions explained herein below may be implemented using hardware circuitries, software means, or a combination of the two. The software means may be in conjunction with a programmed microprocessor or a general purpose computer, using an Application Specific Integrated Circuit (ASIC) and/or Digital Signal Processors (DSP). It will also be appreciated that when the present disclosure is described as a method, it may also be embodied in a computer processor and a memory coupled to the processor, wherein the memory is encoded with one or more programs that perform the method when executed by the processor.

Figure 1:
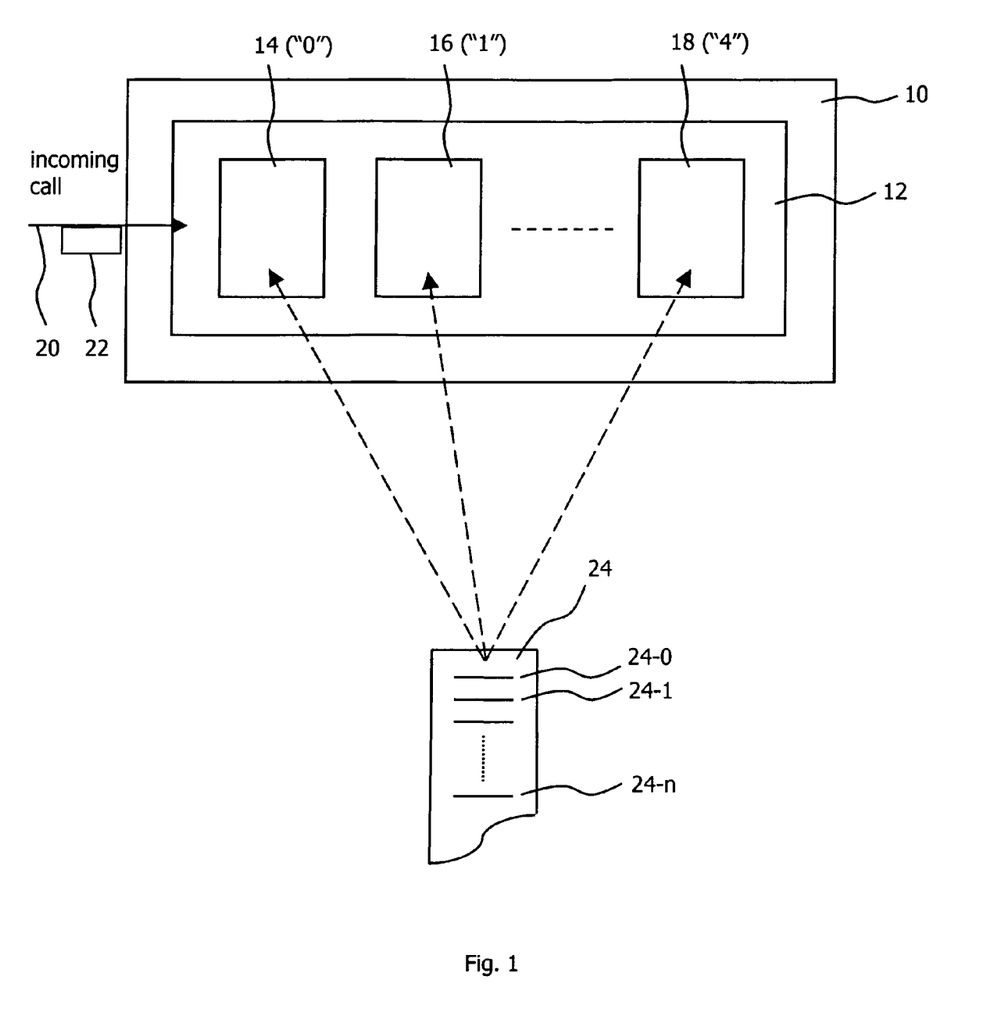
FIG. 1 shows a switch embodiment which illustrates a system overview for the management of call-routing numbers.

As a system overview, FIG. 1 depicts an embodiment of a switch 10 for a mobile communication network (not shown) such as a GSM or W-CDMA network. The switch 10 includes a cluster 12. For clarity of illustration, only one cluster is shown in FIG. 1, although the switch 10 may comprise a plurality of clusters.

The cluster 12 comprises a plurality of cluster members 14, 16, 18, etc. identified by "IDs". For example, the cluster members 14, 16, and 18 shown in FIG. 1 may be given "0", "1", and "4" as their IDs, respectively. Each cluster member, such as 14, is capable of routing an incoming call, denoted as 20 in FIG. 1, to a proper destination. The destination is either a recipient subscriber served by the cluster member 14 receiving the incoming call 20 or another cluster member, such as 16 or 18.

The call routing is performed based on a temporary number 22 associated with the call 20. The temporary number may be a call-routing number such as an MSRN temporarily assigned by the switch 10 to the call 20. For the plurality of cluster members 14, 16 and 18, a series of call-routing numbers is provided for routing incoming calls. The number series is denoted as 24, and it comprises a series of numbers 24-0, 24-1, . . . , 24-n. As indicated by the arrows with dotted lines, the numbers of the number series 24 are distributed between the plurality of cluster members 14, 16 and 18.

Figure 2:
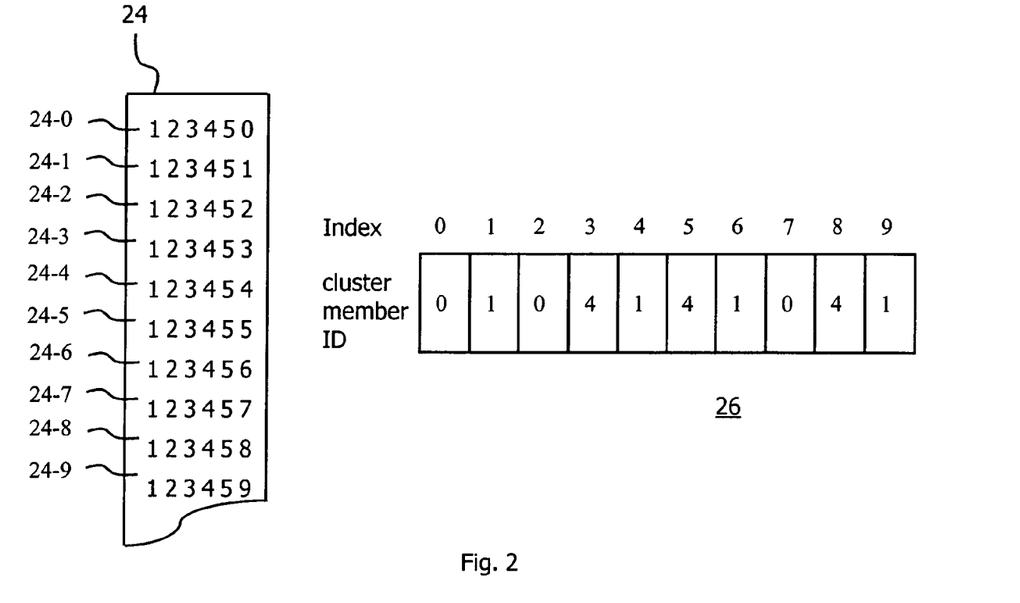
FIG. 2 shows a first embodiment of a data structure used for managing call-routing numbers.

The distribution of the numbers of the number series 24 in FIG. 1 can be achieved by various mechanisms. Depicted in FIG. 2 is an embodiment wherein the distribution of the numbers between the cluster members makes use of a data structure 26. For the ease of understanding, it is assumed that the number series 24 contains 10 numbers, as shown on the left side of FIG. 2. For purposes of explanation and not limitation, the numbers are defined as listed below:

24-0: 123450
24-1: 123451
24-2: 123452
24-3: 123453
24-4: 123454
24-5: 123455
24-6: 123456
24-7: 123457
24-8: 123458
24-9: 123459

Accordingly, the number series 24 may be indicated as "12345x".

The data structure 26 is provided for the distribution, or assignment, of the numbers of a defined number series between the plurality of cluster members (e.g., cluster members 14, 16, and 18 as shown in FIG. 1). The data structure 26 defines an amount of assignments equal to the length of the number series, or in other words, the amount of the numbers in the number series. Each assignment uniquely associates a cluster member with one or more least significant digits of the numbers of the number series.

Although the data structure 26 in FIG. 2 takes the form of a table, it is intended that any other suitable form is applicable. In the data structure 26, 10 assignments are defined, as indicated by 10 table entries indexed from 0 to 9. The amount of the assignments is equal to the length of the number series 24, which is also 10 (the number series 24 comprises 10 numbers). In the data structure 26, each assignment uniquely associates one cluster member with one or more least significant digits of the numbers of the number series to be distributed. For example, as shown in FIG. 2, the table entry corresponding to a certain assignment (at a certain index) comprises the identification of a particular cluster member.

As mentioned above, cluster members may be identified by their "ID"s. Assuming that the IDs for the cluster members 14, 16, and 18 are "0", "1", and "4", respectively, "0", "1" and "4" are assigned/distributed in the table entries of the data structure 26. The cluster members "0", "1", and "4" are associated with the least significant digits of the numbers of the number series. The simplest variant is to associate the cluster members with the least significant digit (i.e., with one single digit) of the numbers of the number series. Referring to the number series 24 in FIG. 2, the least significant digits of the 10 numbers are 0, 1, 2, . . . , 9, respectively. In the particular embodiment shown in FIG. 2, the cluster member 14, with ID "0", is placed at the table entry with index 0, indicating that the cluster member 14 is associated with the least significant digit, 0, of the number 123450 of the number series 24; the cluster member 16, with the ID "1", is placed at the table entry with index 1, indicating that this cluster member is associated with the least significant digit, 1, of the number 123451; the cluster member 18, with the ID "4", is placed at the table entry with index 3, indicating that this cluster member is associated with the least significant digit, 3, of the number 123453; and so on.

It should be noted that only one least significant digit is used for the explanation of the drawings and the related embodiments; however, two or more least significant digits may well be used, and the principle of the association between the assignments and the cluster members remains the same.

Figure 3:
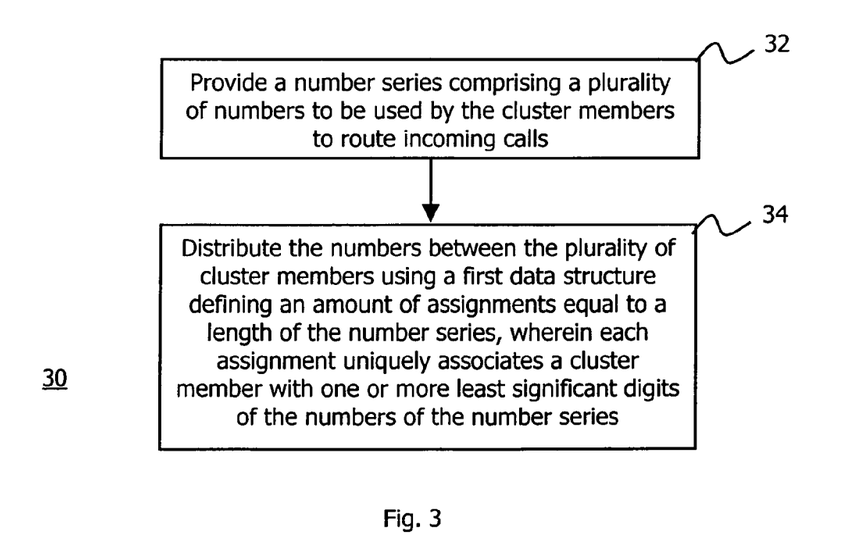
FIG. 3 shows a first method embodiment for distributing call-routing numbers of a defined number series between a plurality of cluster members of a switch cluster.

In the following, with reference to FIGS. 1 to 5, specific examples are given to show how different data structure embodiments can facilitate the distribution of numbers of a defined number series between a plurality of cluster members within a cluster of a switch as shown, for example, in FIG. 1. The cluster configuration of the switch 10 has been explained above with reference to FIG. 1. The switch cluster 12 is adapted to distribute the numbers of a defined number series, e.g. the number series 24 (or "12345x") shown in FIG. 2. FIG. 3 shows a method embodiment 30 illustrating one way of how this distribution can be done.

The method 30 comprises the following basic procedures: firstly, as shown at 32 in FIG. 3, the number series 24 comprising a plurality of numbers 24-0, 24-1, 24-2, etc. is provided to the cluster 12. The numbers are to be used by the cluster members 14, 16, and 18 of the cluster 12 for routing incoming calls. Next, at step 34, the numbers are distributed between the cluster members 14, 16, and 18 using data structure means. The data structure 26 shown in FIG. 2 is a first data structure embodiment. This data structure can be used for the distribution of the numbers of the number series 24 and it can be constructed in the following way:

First, the cluster 12 calculates a table with a number of elements, i.e. table entries, equal to the length of the defined number series. The table contains the IDs of the cluster members in the cluster 12. Preferably, the cluster 12 uses a random or pseudo-random distribution algorithm to calculate the table to allow that each cluster member can calculate the table independently. An example table with 10 numbers per number series and 3 cluster members with IDs "0", "1" and "4" is illustrated by the data structure 26 shown in FIG. 2.

The index of the table is set equal to the least significant digits of the numbers of the number series. In the example using number series 12345x consisting of 10 numbers, the number 123450 would be allocated to the cluster member with ID "0" following the embodiment in FIG. 2, the number 123451 would be allocated to the cluster member with ID "1", and the number 123452 would be allocated to the cluster member with ID "0", etc.

Figure 4:
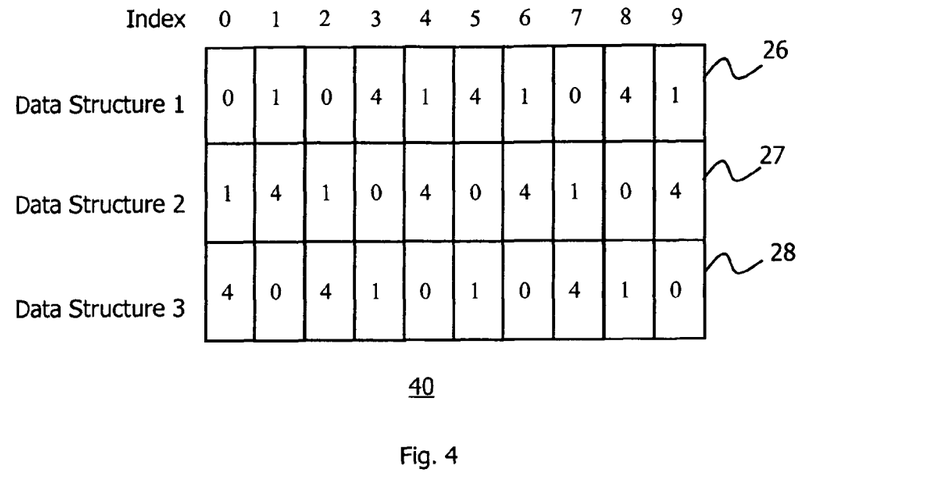
FIG. 4 shows a second embodiment of a data structure used for managing call-routing numbers.

FIG. 4 shows another embodiment of a data structure, denoted as 40, which can be used for the distribution of the numbers of the number series 24. Compared with the data structure 26 shown in FIG. 2, which may be viewed as a "base" data structure, the data structure 40 is more complex and can facilitate a more balanced distribution. As can be seen from the "base" data structure 26 in FIG. 2, the cluster member with ID "1" is allocated 4 times, the other cluster members only 3 times. To prevent the aggravation of this slight unbalance when more than one number series of the same type (e.g., MSRNS) would use the same "base" data structure (e.g., 26), one or more additional data structures similar to the "base" data structure 26, denoted as 27 and 28 in FIG. 4, can be provided, wherein each additional data structure 27, 28 is defined in the same principle as the "base" data structure 26. That is, each additional data structure 27, 28 defines an amount of assignments equal to the length of the number series and each assignment uniquely associates a cluster member with one or more least significant digits of the numbers of the number series. In one implementation, a total number of n data structures, including the "base" data structure 26, are calculated with n being equal to the number of cluster members in the cluster. Together, such n data structures (26, 27, and 28) form the "composite" data structure 40 shown in FIG. 4.

While the "base" data structure 26 can be calculated as described above with reference to FIG. 2, each additional data structure 27, 28 can be calculated subsequently and by using the previous data structure as basis. One of many possible mechanisms for calculating subsequent data structures is to replace each cluster member ID in the data structure by another cluster member ID with a fixed relation between the replaced cluster member ID and the replacing cluster member ID. In the embodiment shown in FIG. 4, a cluster member ID would be replaced by the next higher cluster member ID and the highest cluster member ID would be replaced by the first cluster member ID. In an example with 3 cluster members which have IDs "0", "1" and "4", cluster member ID "0" would be replaced by cluster member ID "1", cluster member ID "1" by cluster member ID "4" and cluster member ID "4" by cluster member ID "0". Using the data structure 40, the assignment of cluster member IDs to the numbers of the number series can be balanced: each cluster member will get the same amount of numbers assigned.

Figure 5:
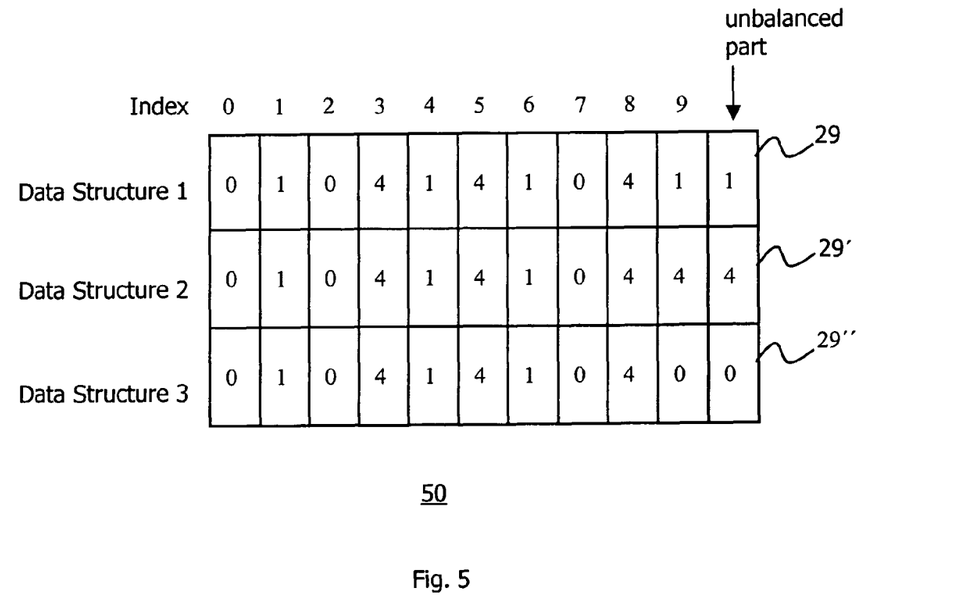
FIG. 5 shows a third embodiment of a data structure used for managing call-routing numbers.

FIG. 5 shows yet another embodiment of a composite data structure 50 which provides a further advantage. This composite date structure 50 comprises three data structures 29, 29' and 29". The "first" data structure 29 is the same as the data structure 26 shown in FIG. 2 appended with one more table entry indicated as "unbalanced part". Each of the subsequent data structures 29' and 29" is identical to 29 with the only exception that the content of the table entry under "unbalanced part" is different from that of 29.

The data structure embodiment 50 facilitates a consideration of the capacities of the cluster members when numbers of the defined number series are distributed between the cluster members. In one implementation, the first data structure 29 would be calculated considering the relative capacities of the cluster members and the subsequent data structures 29' and 29" would replace only the unbalanced table entries with another cluster member ID. For example, only one table entry of the first data structure 29 which contains cluster member ID "1" would be replaced with another cluster member ID in the subsequent data structures 29' and 29". The complete set of data structures 29, 29', and 29" following this approach would look as the "composite" data structure 50 shown in FIG. 5. With this data structure 50, a cluster member with higher capacity will get more numbers assigned than a cluster member with lower capacity.

The data structure discussed herein can be used not only for the distribution of call-routing numbers between a plurality of cluster members, but also for other management tasks of such numbers. For instance, the data structure can facilitate selection of a particular number belonging to a certain number series based on the cluster member assigned to this number; the data structure can also be used for determination of the correct cluster member for a given number of a number series. Details of these additional aspects are given below.

Figure 6:
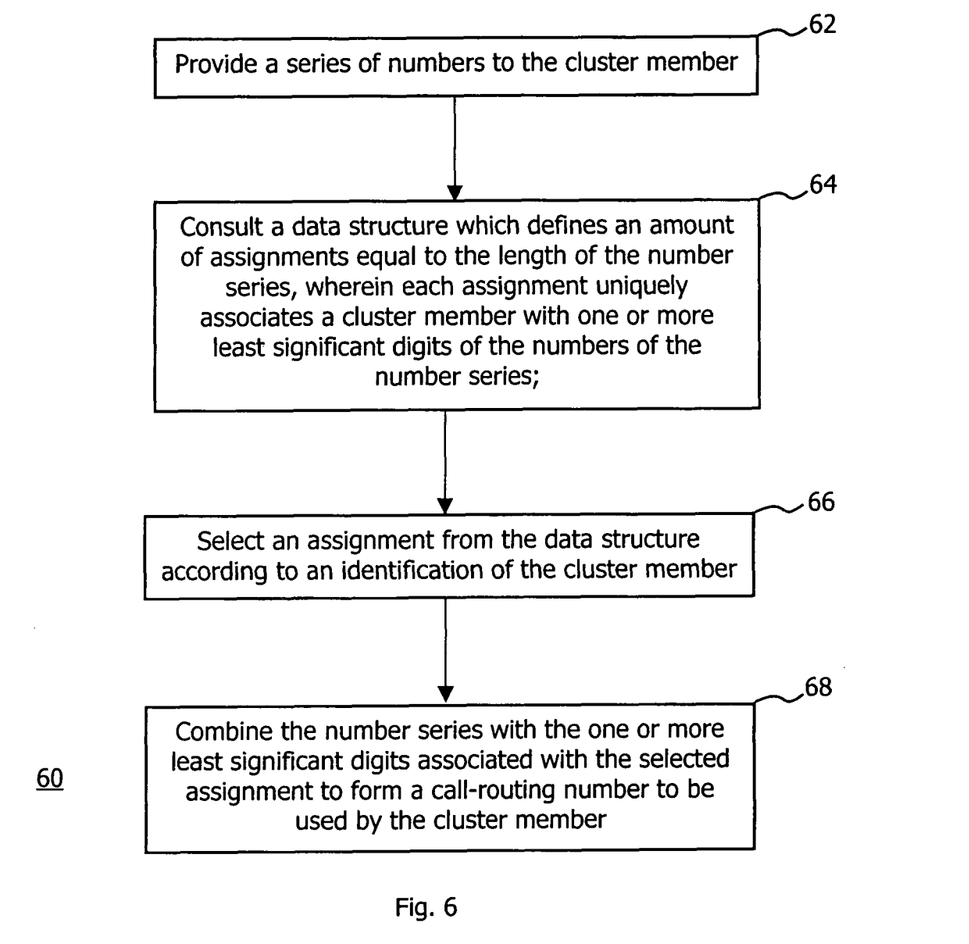
FIG. 6 shows a second method embodiment for determining a call-routing number to be used by a cluster member of a switch cluster.
Figure 7:
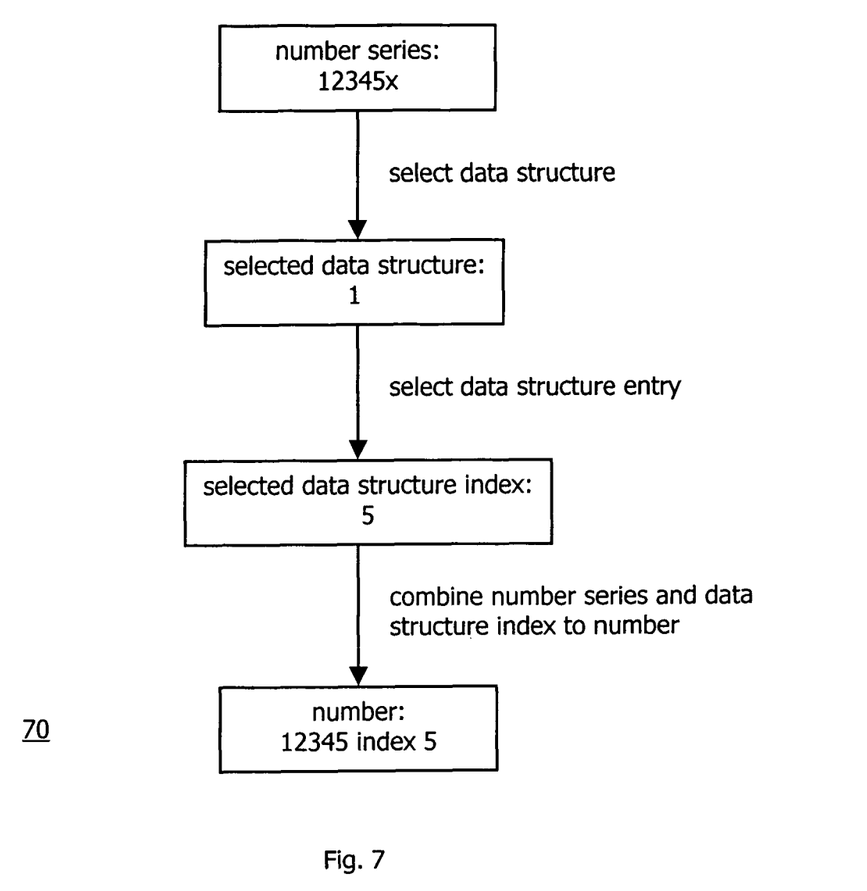
FIG. 7 shows a specific example of the second method embodiment according to FIG. 6.

Referring to FIGS. 6 and 7, which respectively show a further method embodiment 60 and a specific example 70 of the method embodiment 60, a mechanism for selecting a number of a certain number series based on a certain cluster member is provided. These embodiments can be combined with the embodiments discussed above with reference to FIGS. 1 to 5. The selection mechanism is needed, e.g., for MSRN or HON allocation. Input for selection of a number is a certain pre-defined number series.

The switch 10 shown in FIG. 1 may be configured to execute the method embodiment 60 shown in FIG. 6. The method embodiment 60 comprises the following steps: Firstly, at step 62, a series of numbers are provided to a certain cluster member for routing incoming calls. Next, at step 64, the switch 10 consults a data structure which defines an amount of assignments equal to a length of the number series, wherein each assignment uniquely associates a cluster member with one or more least significant digits of the numbers of the number series. Thereafter, at step 66, the switch 10 selects an assignment from the data structure according to an identification of the cluster member. And finally, at step 68, the switch 10 combines the number series with the one or more least significant digits associated with the selected assignment to form a call-routing number to be used by the cluster member.

Intended for a more detailed understanding of the above, FIG. 7 shows a specific example 70 of the method embodiment 60. According to example 70, the first step to select a number by a cluster member (such as cluster member 18 with ID"4") is to determine a data structure from which the number shall be selected. This is done by applying a hash-algorithm on the number series, so that each number series uniquely uses a certain table for number selection. To this end, the operation number series modulo number of cluster members or any other operation may be used.

In an example using the number series 24 (12345x) shown in FIG. 2, the determined data structure would be the first data structure 26 (see in FIGS. 2 and 4) according to:

12345 modulo 3=0→data structure 26

The second step is to select an assignment, e.g. a table entry, which contains the own cluster member ID. The index of the selected assignment used together with the number series (the digits of the number series followed by the index) is the selected number. The logic to select an index (and by that to select a number) depends on function specific requirements, e.g. the selection of a call-routing number from a number series will consider only idle call-routing number (i.e. currently not allocated). In an example using the number series 24 (12345x) and determined data structure 26 as shown in FIG. 2, the cluster member with ID "4" can select the assignment with index 5 according to FIG. 2.

As illustrated in FIG. 7, the third step is to combine the number series and the selected index to the number. In the example using the number series 24 (12345x) and selected index 5, the number finally obtained is 123455. This number can be used by the cluster member with ID "4" when a call-routing number is requested by the related Home Location Register (HLR) for a mobile terminating call for a mobile subscriber registered on the cluster member with ID "4".

Figure 8:
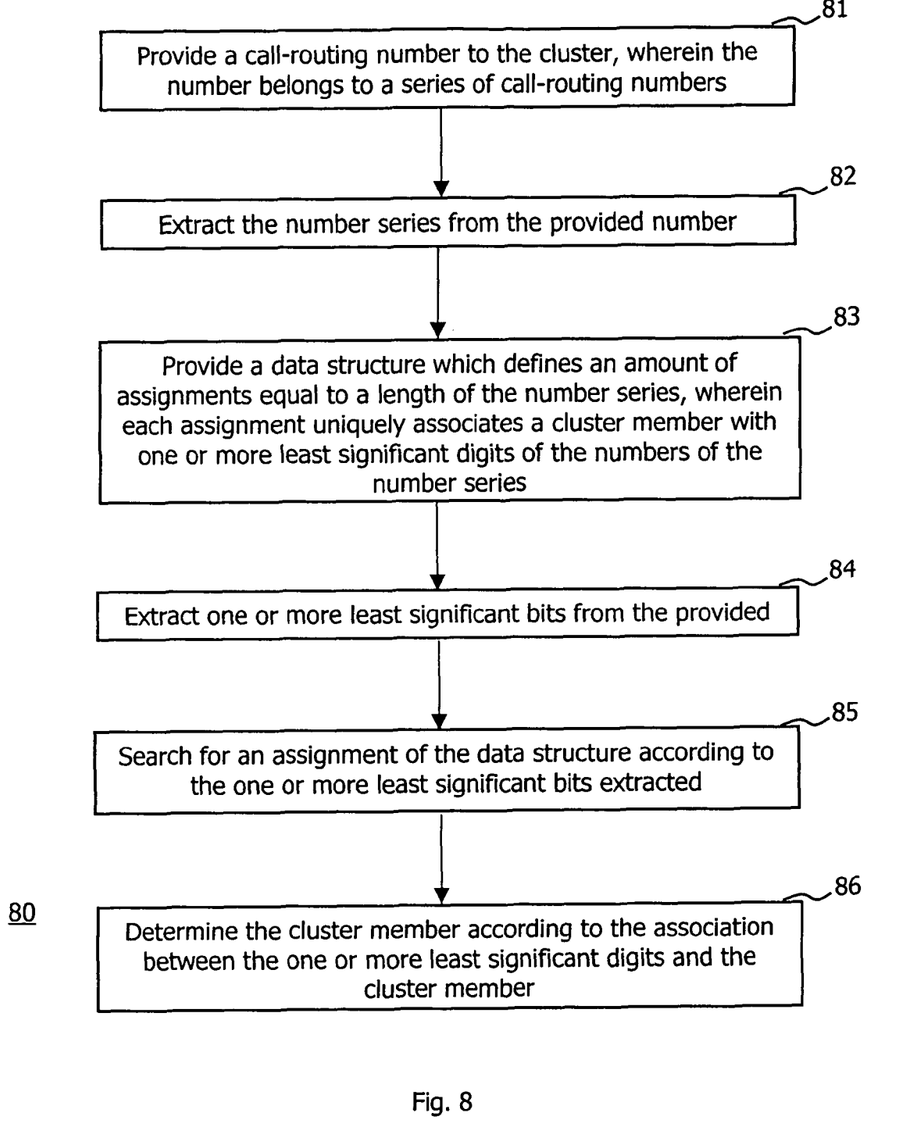
FIG. 8 shows a third method embodiment for determining a cluster member for routing a call.
Figure 9:
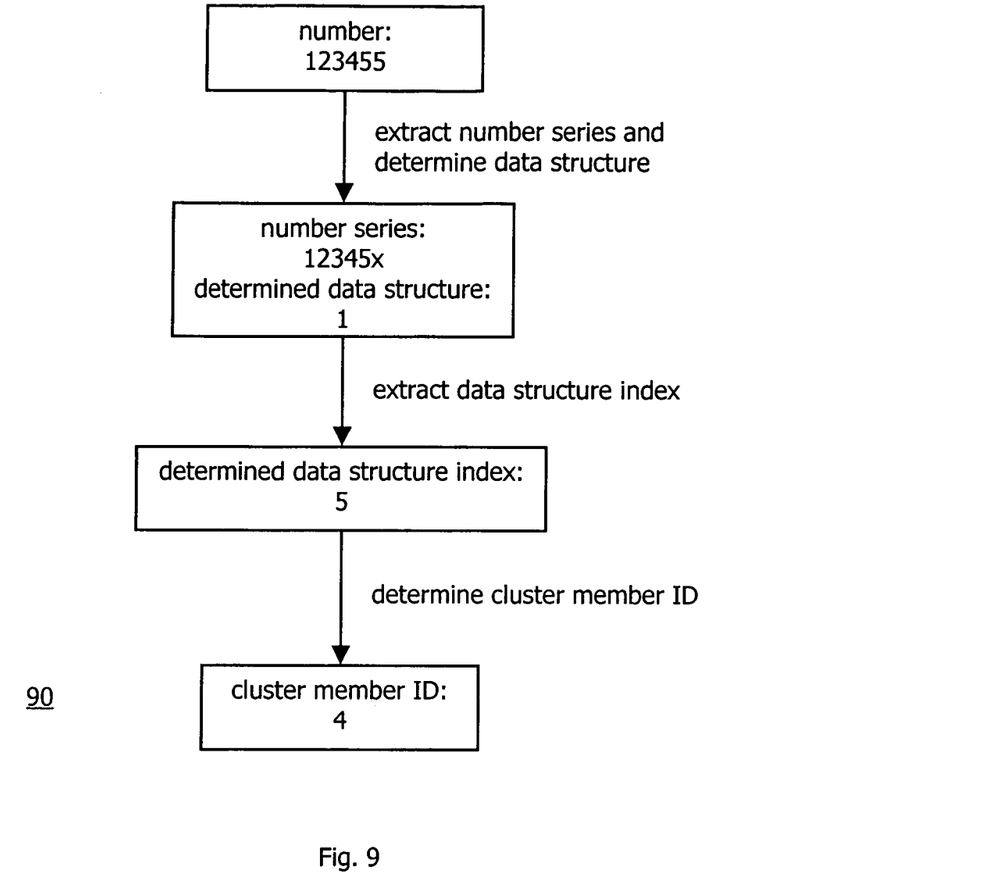
FIG. 9 shows a specific example of the third method embodiment according to FIG. 8.

Referring to FIGS. 8 and 9 which respectively show yet a further method embodiment 80 and a specific example 90 of the method embodiment 80, a mechanism for determination of the correct cluster member for a given call-routing number of a number series is provided. These embodiments can be combined with the embodiments of FIGS. 1 to 7. The determination mechanism is needed, e.g., for determination of the cluster member for a mobile terminating call when an MSRN is received.

The switch embodiment 10 shown in FIG. 7 may be configured to execute the method embodiment 80 shown in FIG. 8. The method 80 comprises the following steps: Firstly, at step 81, a call-routing number is provided to the cluster 12, wherein the number belongs to a series of call-routing numbers. Next, at step 82, the switch 10 extracts the number series from the provided number. Then, at step 83, a data structure is provided which defines an amount of assignments equal to the length of the number series, wherein each assignment uniquely associates a cluster member with one or more least significant digits of the numbers of the number series. Thereafter, at step 84, the switch 10 extracts one or more least significant bits from the provided number. This is followed by step 85, at which the switch 10 searches for an assignment of the data structure according to the one or more least significant bits extracted. Finally, at step 86, the intended cluster member is determined according to the association between the one or more least significant digits and the cluster member.

Intended for a more detailed understanding of the above, FIG. 9 shows a specific example 90 of the method embodiment 80. According to method example 90, the first step is to determine the data structure, from which the cluster member ID shall be determined. This is done by extracting the number series from the number and applying the same hash-algorithm to the number series that has been used for the selection of a number, as described above with reference to FIGS. 6 and 7. In an example using the call-routing number 123455, the extracted number series is 12345x (as shown in FIG. 2). The determined data structure is the first data structure 26 (as shown in FIG. 4) according to:

12345 modulo 3=0→data structure 26

When this is done, the second step is to extract the data structure index from the number. Following the example using the call-routing number 123455, the extracted index is 5 as illustrated in FIG. 7.

The third step is to look for the cluster member ID in the determined data structure at the determined index. In the example using the determined data structure 26 and the determined index 5, the determined cluster ID is "4" according to FIGS. 2 and 4. This means that number 123455 belongs to the cluster member with ID "4". When a mobile terminating call with this number is received in the cluster, the cluster member with ID "4" can be determined as the cluster member which has allocated the 123455 and which has to handle the terminating call.

As has become apparent from the various embodiments discussed above, adding of cluster members can be done without defining new number series. Following the examples presented above, when a new cluster member with ID "5" is added, the distribution data structure can be defined or re-defined to contain cluster member IDs "0", "1", "4" and "5". The selection of a number belonging to the new cluster member with ID "5" works in the same way as described above since the data structure also has entries with the new cluster member ID "5" now.

Adding of cluster members can also be done without any need for reconfiguration in the mobile communication network since no new number series needs to be defined. As a consequence, the routing within the network needs not be changed because no new numbers would need to be considered.

The number of defined number series (e.g. MSRN number series or HON number series) depends on the capacity of the switch, but not statically on the number of cluster members. This avoids waste of resources. As no new number series needs to be defined, new cluster members can be added so that the existing traffic can be shared by more cluster members. The amount of number series needed depends only on the overall amount of traffic of the whole cluster, and not on the number of cluster members which share the traffic.

While the technique has been described with reference to the above embodiments, it is to be understood that the description is for illustration purposes only. Accordingly, it is intended that the invention be limited only by the scope of the claims appended hereto.

The invention claimed is:

1. A method for distributing call-routing numbers for a mobile communication network, the mobile communication network comprising a switch including at least one cluster, the cluster comprising a plurality of cluster members, each cluster member capable of routing an incoming call, based on a temporary number associated with the call, either to a recipient subscriber served by the cluster member or to another cluster member, the method comprising:
   providing a number series comprising a plurality of call-routing numbers to be used by the cluster members to route incoming calls;
   distributing the call-routing numbers between the plurality of cluster members by using a first data structure that:
      has entries that are each addressable by a respective index number that can be combined with the number series to form a call-routing number;
      defines an amount of assignments equal to a length of the call-routing number series;
      only stores, at each entry, a cluster member identification associated with a respective call-routing number having one or more least significant digits that are equal to the index number of the entry;
   wherein each assignment uniquely associates a cluster member with one or more least significant digits of the numbers of the call-routing number series.

2. The method of claim 1 further comprising balancing the number distribution among the plurality of cluster members by using one or more additional such data structures.

3. The method of claim 2 wherein the total amount of the data structures is equal to the number of cluster members in the cluster.

4. The method of claim 2 wherein the additional data structures are defined based on the first data structure.

5. The method of claim 4 wherein each additional data structure is defined by replacing each cluster member identification in the first data structure by another cluster member identification in the additional data structure according to a fixed relation existing between the replaced cluster member identification and the replacing cluster member identification.

6. The method of claim 4 wherein each additional data structure is defined by replacing a specific cluster member identification in the first data structure by another cluster member identification in the additional data structure.

7. The method of claim 1 wherein the call-routing numbers are Mobile Station Roaming Numbers or Handover Numbers.

8. A method for determining a call-routing number to be used by a cluster member of a cluster of a switch of a mobile communication network, the switch including at least one cluster, the cluster comprising a plurality of cluster members, each cluster member capable of routing an incoming call, based on a temporary number associated with the call, either to a recipient subscriber served by the cluster member or to another cluster member, the method comprising:
   providing a series of call-routing numbers to the cluster member;
   consulting a data structure that:
      has entries that are each addressable by a respective index number that can be combined with the number series to form a call-routing number;
      defines an amount of assignments equal to a length of the call-routing number series;
      only stores, at each entry, a cluster member identification associated with a respective call-routing number having one or more least significant digits that are equal to the index number of the entry;
   selecting an assignment from the data structure according to a cluster member identification;
   combining the call-routing number series with an index number associated with the selected assignment to form a call-routing number to be used by the cluster member;
   wherein each assignment uniquely associates a cluster member with one or more least significant digits of the numbers of the call-routing number series.

9. The method of claim 8 wherein the providing the data structure comprises applying a hash function on the call-routing number series.

10. The method of claim 8 wherein the providing the data structure comprises hashing the call-routing number series modulo a number of cluster members of the cluster.

11. A method for determining a cluster member for routing a call for a mobile communication network, the mobile communication network comprising a switch including at least one cluster, the cluster comprising a plurality of cluster members, each cluster member capable of routing an incoming call, based on a temporary number associated with the call, either to a recipient subscriber served by the cluster member or to another cluster member, the method comprising:
- providing a call-routing number to the cluster, wherein the call-routing number belongs to a series of call-routing numbers;
- extracting the call-routing number series from the provided number;
- providing a data structure that:
  - has entries that are each addressable by a respective index number that can be combined with the number series to form a call-routing number;
  - defines an amount of assignments equal to a length of the call-routing number series;
  - only stores, at each entry, a cluster member identification associated with a respective call-routing number having one or more least significant digits that are equal to the index number of the entry;
- extracting one or more least significant bits from the provided call-routing number;
- searching for an assignment of the data structure by using the one or more extracted least significant bits as an index number; and
- determining the cluster member according to the association between the one or more least significant digits and the cluster member based on the data structure;
- wherein each assignment uniquely associates a cluster member with one or more least significant digits of the numbers of the call-routing number series.

12. A non-transitory computer readable medium comprising a computer program product for controlling a portion of a switch of a mobile communication network, the mobile communication network comprising the switch including at least one cluster, the cluster comprising a plurality of cluster members, each cluster member capable of routing an incoming call, based on a temporary number associated with the call, either to a recipient subscriber served by the cluster member or to another cluster member, the computer program product comprising software code instructions which, when run on the portion of the switch entity, causes the switch to:
- provide a number series comprising a plurality of call-routing numbers to be used by the cluster members to route incoming calls;
- distribute the call-routing numbers between the plurality of cluster members by using a first data structure that:
  - has entries that are each addressable by a respective index number that can be combined with the number series to form a call-routing number;
  - defines an amount of assignments equal to a length of the call-routing number series;
  - only stores, at each entry, a cluster member identification associated with a respective call-routing number having one or more least significant digits that are equal to the index number of the entry;
  - wherein each assignment uniquely associates a cluster member with one or more least significant digits of the numbers of the call-routing number series.

13. A switch for a mobile communication network, the switch including at least one cluster, the cluster comprising:
- a plurality of cluster members, each cluster member capable of routing an incoming call, based on a temporary number associated with the call, either to a recipient subscriber served by the cluster member or to another cluster member,
- wherein a number series comprising call-routing numbers to be used by the cluster members for routing incoming calls is provided;
- wherein the numbers of the call-routing number series are distributed between the plurality of cluster members;
- wherein the cluster is configured to distribute the call-routing numbers between the plurality of cluster members by using a first data structure that:
  - has entries that are each addressable by a respective index number that can be combined with the number series to form a call-routing number;
  - defines an amount of assignments equal to a length of the call-routing number series;
  - only stores, at each entry, a cluster member identification associated with a respective call-routing number having one or more least significant digits that are equal to the index number of the entry;
- wherein each assignment uniquely associates a cluster member with one or more least significant digits of the numbers of the call-routing number series.

14. The switch of claim 13 wherein the cluster is configured to balance the number distribution among the plurality of cluster members by using one or more additional such data structures.

15. The switch of claim 14 wherein the cluster is configured to use as many data structures as the number of cluster members in the cluster to balance the number distribution.

16. The switch of claim 14 wherein the cluster is configured to define the additional data structures based on the first data structure.

17. The switch of claim 16 wherein the cluster is configured to define each additional data structure by replacing each cluster member identification in the first data structure by another cluster member identification in the additional data structure according to a fixed relation existing between the replaced cluster member identification and the replacing cluster member identification.

18. The switch of claim 16 wherein the cluster is configured to define each additional data structure by replacing a specific cluster member identification in the first data structure by another cluster member identification in the additional data structure.

19. A switch for a mobile communication network, the switch including at least one cluster, the cluster comprising:
- a plurality of cluster members, each cluster member capable of routing an incoming call, based on a temporary number associated with the call, either to a recipient subscriber served by the cluster member or to another cluster member;
- wherein a number series comprising call-routing numbers to be used by a cluster member for routing an incoming call is provided to the cluster member;
- wherein the switch is configured to:
  - consult a data structure that:
    - has entries that are each addressable by a respective index number that can be combined with the number series to form a call-routing number;
    - defines an amount of assignments equal to a length of the call-routing number series;
    - only stores, at each entry, a cluster member identification associated with a respective call-routing number having one or more least significant digits that are equal to the index number of the entry;
  - select an assignment from the data structure according to a cluster member identification; and combine the call-routing number series with an index number associated with the selected assignment to form a call-routing number to be used by the cluster member;

wherein each assignment uniquely associates a cluster member with one or more least significant digits of the numbers of the call-routing number series.

20. The switch of claim 19 wherein the cluster is configured to create the data structure by applying a hash function on the call-routing number series.

21. The switch of claim 19 wherein the cluster is configured to create the data structure by hashing the call-routing number series modulo the number of cluster members of the cluster.

22. The switch of claim 19 wherein the call-routing numbers are Mobile Station Roaming Numbers or Handover Numbers.

23. A switch for a mobile communication network, the switch including at least one cluster, the cluster comprising:
   a plurality of cluster members, each cluster member capable of routing an incoming call, based on a temporary number associated with the call, either to a recipient subscriber served by the cluster member or to another cluster member;
   wherein a call-routing number is provided to the cluster, wherein the number belongs to a series of call-routing numbers to be used by cluster members to route incoming calls;
   wherein the switch is configured to:
      extract the call-routing number series from the provided number;
      provide a data structure that:
         has entries that are each addressable by a respective index number that can be combined with the number series to form a call-routing number;
         defines an amount of assignments equal to a length of the call-routing number series;
         only stores, at each entry, a cluster member identification associated with a respective call-routing number having one or more least significant digits that are equal to the index number of the entry;
      extract one or more least significant bits from the provided number;
      search for an assignment of the data structure by using the one or more extracted least significant digits as an index number; and
      determine the cluster member according to the association between the one or more least significant digits and the cluster member
   wherein each assignment uniquely associates a cluster member with one or more least significant digits of the numbers of the call-routing number series.

* * * * *